United States Patent [19]
Hoffmeyer et al.

[11] 3,800,616
[45] Apr. 2, 1974

[54] SAFETY GRIP FOR POWERED IMPLEMENT

[75] Inventors: Knud H. Hoffmeyer; Charles A. Wuerker, Jr., both of Racine, Wis.

[73] Assignee: Jacobsen Manufacturing Company, Racine, Wis.

[22] Filed: Aug. 20, 1973

[21] Appl. No.: 389,492

Related U.S. Application Data

[63] Continuation of Ser. No. 247,181, April 24, 1972, abandoned.

[52] U.S. Cl................ 74/470, 56/11.3, 74/491, 74/523, 180/19 H
[51] Int. Cl................................................ G05g 7/04
[58] Field of Search......... 74/470, 469, 523; 551.8, 74/491; 56/11.3, 11.5, 11.7, 11.8; 172/42; 180/29 H, 19 R; 192/99 S

[56] References Cited
UNITED STATES PATENTS

| | | | |
|---|---|---|---|
| 2,696,705 | 12/1954 | Greber | 56/11.5 |
| 2,847,924 | 8/1958 | Quick | 172/42 X |

*Primary Examiner*—Samuel Scott
*Assistant Examiner*—F. D. Shoemaker
*Attorney, Agent, or Firm*—Arthur J. Hansmann

[57] ABSTRACT

A safety grip for powered implements of the hand-controlled type and including a hand grip being horizontally disposed and having a lever connected therewith and pivoted on a horizontal axis and extending above the hand grip. The weight of the operator's hand and arm are then placed downwardly onto the lever which automatically pivots the lever and which moves the lever into closed position with the hand grip and the operator need not squeeze the lever and hand grip together to achieve the closed position. The lever is connected to the drive train of the implement for controlling mobilization of the implement, and the lever is thus in the nature of a dead man's control.

6 Claims, 3 Drawing Figures

PATENTED APR 2 1974　　　　　　　　　　　　　3,800,616

SAFETY GRIP FOR POWERED IMPLEMENT

This is a continuation of our U.S. Pat. application Ser. No. 247,181, filed Apr. 24, 1972, and now abandoned.

This invention relates to a safety grip for powered implements of the hand controlled type. More particularly, it relates to a dead man's type of control which does not require that the operator be gripping or squeezing the control in order to have the control in the operative position.

BACKGROUND OF THE INVENTION

The prior art is already aware of lever type of controls for powered implements, and examples of such are seen in U.S. Pat. No. 2,696,705 where the implement is a lawn mower and the operating controls include a pivoted lever adjacent the hand grip. However, this type of control lever requires that the operator exert a squeezing force through his hand in order to pivot the lever into closed position with the hand grip, and he must maintain that squeezing tension in his hand and arm in order to have the control in operation. Another example of this type of lever control which requires squeezing is shown in U.S. Pat. No. 2,903,077 where the lever is on a horizontal pivot but is disposed below the implement hand grip, and again the operator must maintain a hand squeeze in order to have the lever in the closed or operative position. Still another example of a lever type control, though not pertaining to an implement, is shown in U.S. Pat. No. 3,190,386 where a lever is pivoted above a hand grip which is enclosed in a tubular housing, and thus the operator must reach into the housing and again squeeze the lever into closed position with the hand grip in order to place the control in operating position.

In all known instances of the prior art, there is no arrangement which avoids the squeezing action, and thus the operator must continually exert a hand force in order to have the pivoted control lever in the operative position. Of course such exertion requires effort and is tiring, and it is a distraction from the major concern of steering and otherwise controlling the implement itself. Still further, with some of the prior art pivoted levers, such as the last patent mentioned above, the operator cannot hold the hand grip alone, that is without also holding the pivoted lever, since there simply is not sufficient provision or room for him to grip the hand grip without also encountering the lever. This shortcoming in prior art devices means that the operator does not have the option of gripping and controlling the implement without also encountering or gripping the pivoted lever, and thus his choice and freedom for maneuvering the implement is restricted in the prior art arrangements.

Accordingly, it is a general object of this invention to provide a safety grip for powered implements of the hand controlled type and wherein the grip is in the nature of a dead man's grip and is a general improvement upon the prior art grips, according to the aforementioned problems and concerns.

More specifically, it is an object of this invention to provide safety grip for powered implements wherein the weight of the operator's hand and arm alone are sufficient to pivot the control lever of the grip into the closed or operating position, and therefore the operator is not required to squeeze the lever through a continuous forcing by his hand.

Still another specific object of this invention is to provide a safety grip for powered implements and having the aforementioned advantages and wherein the operator can grasp either the hand grip or the safety lever along with the hand grip, but he need not always grasp the safety lever and may grasp only the hand grip and thereby guide the implement through grasping the hand grip only.

Other objects and advantages will become apparent upon reading the following disclosure, and these include the simplicity of structure and the inexpensive manufacture and the ease of operating and the automatic nature of operating the safety grip of this invention.

DETAILED DESCRIPTION OF THE PREFERRED EMBODIMENT

Figure 1:
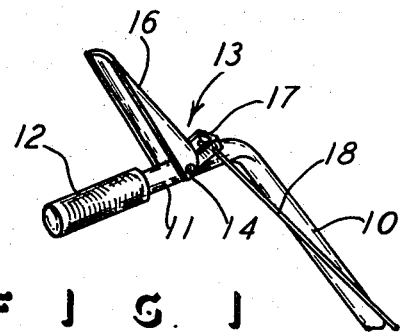
FIG. 1 is a rear and side perspective view of an embodiment of this invention and showing the control lever in the open position.
Figure 2:
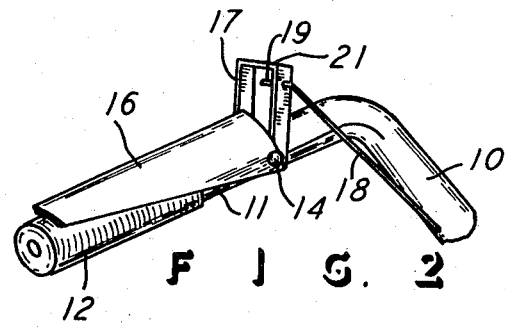
FIG. 2 is a view similar to FIG. 1 but being slightly enlarged and showing the control lever in the closed position.

An implement handle 10 is shown extending in a rearward and upward direction from an implement which may be resting on the ground and which may be a snow blower or the like. The handle 10 terminates in a horizontally extending portion 11 which carries a hand grip 12. The handle 10 and the implement itself is of a conventional nature which terminates in the horizontally extending portion 11 which is disposed in the fore-and-aft direction of the implement. FIG. 1 further shows the safety grip or control lever or dead man's control which is generally designated 13 and which is pivoted on the handle horizontal end 11 by means of a pivot pin 14 which is horizontally disposed and extends transversely through the handle end 11. The control 13 includes the hand engageable lever portions 16 connected to the pin 14 to be pivoted thereon from the upper position in FIG. 1 to the lowered or closed position of FIG. 2. The safety grip 13 also includes a U-shaped bracket 17 which is affixed to the lever 16 to pivot therewith, as shown between FIGS. 1 and 2. A control rod 18 is attached at its offset end 19 to the bracket 17 by extending through an opening in one of the legs of the bracket 17, as best seen in FIG. 2. It will then be understood that the rod 18 extends downwardly and forwardly to the implement, and the rod extends substantially along the inclined portion of the implement handle 10, as indicated.

FIG. 1 shows the lever 16 in its limited upward pivoted position, and, in this position, the lever 16 is 45° or more angulated upwardly relative to the horizontal plane of the handle portion 11 and the hand grip 12. Thus, in the FIG. 1 position, the operator has the choice of placing his hand on top of the hand grip 12, without touching the lever 16, or, he can place his hand on the lever 16 and move it to the position shown in FIG. 2. Of course if he does not place his hand on top of the lever 16 to move it to the FIG. 2 position, then he is not utilizing the lever 16 and operating the control rod 18, but, instead, he is simply guiding the implement without the need for negotiating the lever 16. It will be further noted that the lever 16 is arcuately shaped along its length, and the hand grip 12 is cylindrically shaped along its length, and the lever 16 forms substantially a semi-circular cross-section adjacent the pivot pin 14, so the lever 16 nests with the grip 12, due to the arcuate or curved shape of the lever 16 and thus one substantially continuous grip is available to the operator in the operating or FIG. 2 position of the lever 16 and he can therefore obtain efficient and full control of the implement. Of significant importance is the fact that the lever 16 is pivoted about a horizontal pivot pin 14 and is therefore pivotal in a vertical plane so that with the lever pivotal above the hand grip 12 only the weight of the operator's hand and arm is necessary and required for pivoting the lever to the operating or closed position of FIG. 2. That is, the operator does not have to continuously exert hand force and squeeze the lever 16 against the hand grip 12. Further, by means hereinafter described, as soon as the operator removes the weight of his hand and arm from the lever 16, then the lever 16 returns to the FIG. 1 position and the control is then shut off.

The bracket 17, being affixed to the lever 16, such as by welding or the like, serves as a limit for the upward pivotal movement of the lever 16 since the intermediate lever portion 21 is a stop which abuts the implement handle 10 in the FIG. 1 position. Thus the lever 16 is always retained and held in the specific position mentioned and shown when the operator does not have his hand on the lever 16.

Thus, there is no obstruction vertically above the lever 16 so the full downward weight of the operator's hand and arm is all that is required to pivot the lever 16 to the closed position of FIG. 2. Further, the arcuate shape of the lever 16 conforms to the curvature of the hand grip 12, that is, the arcuate shape is centered about the longitudinal axis of the hand grip 12, so the lever 16 fully and snugly nests with the hand grip 12 to present only one cylindrical piece which is gripped by the operator when the lever 16 is in the FIG. 2 position.

Figure 3:
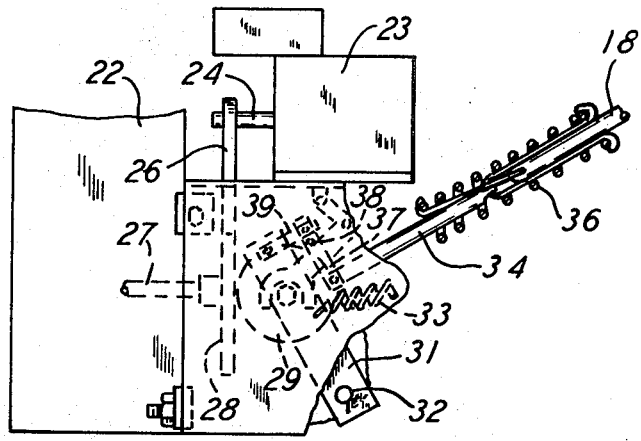
FIG. 3 is a side elevational view of a fragment of an implement and showing an application for the control lever seen in FIGS. 1 and 2.

FIG. 3 shows one use of the safety grip shown and described in connection with FIGS. 1 and 2, and this use is that for a powered implement of a snow blower type and is as shown and described in U.S. Pat. No. 3,334,429. Here a snow blower housing 22 supports a gasoline engine 23 whose crank shaft 24 drives a belt 26 extending to the blower driven shaft 27. Thus, operation of the engine 23 will cause rotation of the shaft 27 through rotation of a disc 28 which is on shaft 27. A driven disc 29 is in rolling contact with the disc 28 and is rotatably supported on a pivoted bracket 31 which pivots about the pivot support 32 suitably mounted on the implement housing 22. Thus the driven disc 29 can move toward and away from the disc 28 and thereby be placed into driving or neutral position relative to the disc 28. A tension spring 33, connected between the bracket 31 and the implement housing 22, normally urges the bracket 31 into a clockwise pivoted position as seen in FIG. 3, and this normally moves the disc 29 away from the disc 28 and the rod 18 and the lever 16 are thusly urged into their FIG. 1 positions.

To engage the implement drive by moving the disc 29 into rolling contact with the disc 28, the safety grip 13 is operated and the attached control rod 18 is axiallly displaced to effect the driving engagement mentioned. Thus the control rod 18 is suitably connected to the bracket 31 to move the disc 29 into driving engagement with the disc 28 when the lever 16 is placed into the FIG. 2 position. The connection between the rod 18 and the bracket 31 is shown to include a rod 34 which is flexibly connected to the rod 18 through a compression spring 36, of the usual connection and such as that shown and which thereby presents a longitudinally extendible control attachment which has rods 18 and 34 and spring 36, and the control attachment includes the bracket 31 and links 37 and 39. The lower end of the rod 34 is pivotally connected to a lever 37 which is pivoted on the implement housing 22 at the pivot connection 38. A link 39 has one end pivotally connected to the end of the lever 37 opposite from the pivot connection of the lever 37 to the rod 34. The other end of the link 39 is pivotally connected to the bracket 31. Through this type of linkage connection, retraction of the rod 18 toward the hand grip 12 will pivot the bracket 31 into a position to cause the rotatable disc 29 to move into rolling contact with the disc 28, as mentioned. The spring 36 permits the flexibility along the combined rods 18 and 34 when the lever 16 is fully depressed in the FIG. 2 position. So the lever 16 pivots between the upwardly pivoted disengaged position of stop 21 against the handle 10, and the downwardly pivoted engaged position against the hand grip 12. Further, it will be seen and understood by one skilled in the art that the connection described is substantially a conventional type, and, it includes drive means to the ground engaging wheels of the implement fragmentarily shown so that the disc 29 can be utilized to transmit the traction power to the implement.

What is claimed is:

1. In a safety grip for powered implements of the handcontrolled type, a handle, a hand grip on the end of said handle, a lever pivotally connected on said handle, a control attachment connected to said lever and extending therefrom along said handle for controlling the operation of the powered implement according to the pivoted position of said lever, said hand grip being disposed to extend at least generally in a horizontal direction of orientation for being approached by the operator's hand from above said grip in the gripping of said hand grip, the improvement comprising said lever being disposed directly above said hand grip and being pivotal in the vertical plane thereabove and being arranged to overlie said grip and having some of the shape of said grip to conform therewith into a grip unit in the downwardly pivoted position of said lever, said lever and said grip being clear of any obstruction in the vertical plane thereabove so that the operator's arm can be disposed directly above said lever when his hand is on said lever, whereby the downward force of the weight of the hand and arm of the operator holds said lever downward without the need for hand-squeezing said lever to said grip, an extendible member included in said control attachment and being extendible for temporary extension of said control attachment in response to pivotal movement of said lever into said downward pivotal position of said lever, whereby said lever can be positioned into the conforming overlying abutment with said grip, and resilient means operative on said control attachment for yieldingly urging said control attachment, and thereby also said lever, into the direction for the upward pivotal position of said lever.

2. The safety grip as claimed in claim 1, wherein said control attachment includes two pieces, and said extendible member is a spring connected between said two pieces.

3. The safety grip as claimed in claim 1, and including a stop on said lever for engaging said handle and thereby limiting upward pivotal movement of said lever in the direction against the urging of said resilient means, and with said resilient means on said control attachment being of an adequate length to have resilient action sufficient for yieldingly holding said lever in said upward position against said stop.

4. The safety grip as claimed in claim 1, wherein said grip is cylindrically shaped and said lever is arcuate in its cross-sectional shape to conform to the curvature of said grip and rest thereover when said lever is depressed onto said grip.

5. The safety grip as claimed in claim 1, including a U-shaped piece pivotal with said lever and extending across the plane of said handle and into abutment with said handle when said lever is pivoted away from said grip, for limiting pivotal movement of said lever in the direction away from said grip.

6. The safety grip as claimed in claim 5, wherein said piece is related to said lever in a disposition wherein said lever can pivot to an angle of at least 45° away from the longitudinal axis of said grip before said piece abuts said handle.

* * * * *